(12) United States Patent
Ueda et al.

(10) Patent No.: US 7,788,905 B2
(45) Date of Patent: Sep. 7, 2010

(54) FUEL FRACTIONATION METHOD AND FUEL FRACTIONATION APPARATUS FOR INTERNAL COMBUSTION ENGINE

(75) Inventors: Takanori Ueda, Susono (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1293 days.

(21) Appl. No.: 10/561,835

(22) PCT Filed: Jun. 14, 2004

(86) PCT No.: PCT/JP2004/008657

§ 371 (c)(1),
(2), (4) Date: Dec. 22, 2005

(87) PCT Pub. No.: WO2005/003546

PCT Pub. Date: Jan. 13, 2005

(65) Prior Publication Data

US 2006/0242949 A1    Nov. 2, 2006

(30) Foreign Application Priority Data

Jul. 1, 2003 (JP) .............................. 2003-189799
Sep. 17, 2003 (JP) .............................. 2003-324748

(51) Int. Cl.
*F01N 3/00* (2006.01)
(52) U.S. Cl. ............... 60/286; 60/274; 60/295; 60/303; 123/525; 123/543
(58) Field of Classification Search ............ 60/274, 60/286, 295, 303; 123/525, 527, 543, 544, 123/557

See application file for complete search history.

(56) References Cited

U.S. PATENT DOCUMENTS

| 4,606,319 | A | 8/1986 | Silva |
| 4,784,092 | A * | 11/1988 | Pitti ........................... 123/525 |
| 5,189,876 | A | 3/1993 | Hirota et al. |
| 5,327,875 | A | 7/1994 | Hall |
| 6,758,194 | B2 * | 7/2004 | Shetley et al. ............... 123/557 |
| 6,843,236 | B1 * | 1/2005 | Shetley ....................... 123/525 |
| 6,953,029 | B2 * | 10/2005 | Uitenbroek ................. 123/527 |

FOREIGN PATENT DOCUMENTS

| EP | 0 441 401 A1 | 8/1991 |
| GB | 2 295 561 A | 6/1996 |
| JP | A 63-068714 | 3/1988 |
| JP | A-04-214918 | 8/1992 |

(Continued)

*Primary Examiner*—Tu M Nguyen
(74) *Attorney, Agent, or Firm*—Oliff & Berridge, PLC

(57) ABSTRACT

A fuel fractionation method which can suitably control a state of a fuel at a time of fractionating the fuel in an internal combustion engine, which includes the steps of applying an operation for promoting a fractionation of a fuel of an engine to a fractionation passage while making the fuel flow to the fractionation passage, thereby fractionating the fuel into a gas phase fuel and a liquid phase fuel within the fractionation passage, conducting the fractionated gas phase fuel and the fractionated liquid phase fuel to a branch point of the fractionation passage, and separating the gas phase fuel and the liquid phase fuel to a gas phase passage and a liquid phase passage, respectively due to gravity.

10 Claims, 10 Drawing Sheets

FOREIGN PATENT DOCUMENTS

| | | |
|---|---|---|
| JP | A-05-222923 | 8/1993 |
| JP | B2 2850547 | 11/1998 |
| JP | A 11-210447 | 8/1999 |
| JP | B2 3093905 | 7/2000 |
| JP | A 2001-193525 | 7/2001 |

* cited by examiner

FUEL FRACTIONATION METHOD AND FUEL FRACTIONATION APPARATUS FOR INTERNAL COMBUSTION ENGINE

TECHNICAL FIELD

The present invention relates to a fuel fractionation method and a fuel fractionation apparatus for an internal combustion engine.

BACKGROUND ART

There has been known an exhaust gas purifying apparatus which heats a fuel accumulated around an exhaust pipe of an internal combustion engine by an exhaust heat so as to fractionate the fuel into a light component in a gas phase and a heavy component in a liquid phase, and supplies the fractionated light component as a reducing agent to an NOx occlusion-reduction type catalyst so as to reduce the NOx discharged by the catalyst (refer to JP 3093905 B). In addition, there are publications of JP 2850547 B, JP 11-210447 A and JP 2001-193525 as documents related to the present invention.

DISCLOSURE OF THE INVENTION

In the conventional apparatus mentioned above, since a lot of fuel is accumulated around the exhaust pipe, a fuel temperature responds poorly to an exhaust gas temperature change, and there is a case where it is hard to control the fuel temperature in a temperature range suitable for the fractionation. Further, when the fractionation temperature is improper, the light component is not vaporized or the heavy component is vaporized, whereby the light component and the heavy component are mixed.

Accordingly, an object of the present invention is to provide a fuel fractionation method and a fuel fractionation apparatus for an internal combustion engine which can easily and rapidly control a fuel to a state suitable for a fractionation so as to separate the fuel into a light component and a heavy component.

To achieve the object mentioned above, there is provided a fuel fractionation method for an internal combustion engine comprising the steps of: applying an operation for promoting, a fractionation of a fuel of the internal combustion engine to a fractionation passage while making the fuel flow to the fractionation passage, thereby fractionating the fuel into a gas phase fuel and a liquid phase fuel within the fractionation passage; conducting the fractionated gas phase fuel and the fractionated liquid phase fuel to a branch point of the fractionation passage; and separating the gas phase fuel and the liquid phase fuel to an upper branch passage and a lower branch passage, respectively due to gravity.

According to the fuel fractionation method of the present invention, since the operation for promoting the fractionation is applied to the fractionation passage while making the fuel flow to the distributing passage, a response of the fuel to the operation for promoting the fractionation becomes sensitive in comparison with the case of fractionating a lot of fuel accumulated in a certain position all at once, and it is possible to easily and rapidly control the fuel to a state suitable for the fractionation.

Further, since the gas phase fuel and the liquid phase fuel are separated into the different branch passages respectively from the branch point by utilizing a difference in a specific weight between the gas phase fuel and the liquid phase fuel, a separation of the fractionated gas phase fuel and liquid phase fuel can be achieved by a simple structure. In this case, the operation for promoting the fractionation is typically achieved by heating, however, the other operations than the heating operation can be employed as far as the operation can promote the vaporization of the fuel.

To achieve the object mentioned above, there is also provided a fuel fractionation apparatus for an internal combustion engine comprising: a fractionation passage which is connected to a fuel supply system of the internal combustion engine and reaches a branch point in a terminal end through a fractionation section to which a fractionation promoting effect of a fuel is applied; a liquid phase branch passage which is branched to a lower side from the branch point; and a gas phase branch passage which is branched to an upper side than the liquid phase branch passage from the branch point.

According to the fuel fractionation apparatus of the present invention, in the same manner as the fractionation method mentioned above, it is possible to easily and rapidly control the fuel to the state suitable for the fractionation. Further, the separation of the fractionated gas phase fuel and liquid phase fuel can be achieved by a simple structure. In this case, the fuel fractionation promoting operation can include any operations as far as the operation can promote the vaporization of the fuel, in the same manner as the operation for promoting the fractionation in the fuel fractionation method according to the present invention mentioned above.

In the fuel fractionation apparatus of the present invention, an inlet of the liquid phase branch passage may be provided with a gas phase fuel in flow inhibiting portion for inhibiting the gas phase fuel from flowing into a downstream side of the liquid phase branch passage due to an existence of the liquid phase fuel. In this case, even when the gas phase fuel flows into the inlet of the liquid phase branch passage from the branch point, it is possible to inhibit the gas phase fuel from flowing into the downstream side of the liquid phase branch passage by the gas phase fuel inflow inhibiting portion. Accordingly, it is possible to securely recover the light component and the heavy component from the respective branch passages in parts. Further, an orifice may be provided in the gas phase fuel in flow inhibiting portion. Since the liquid phase branch passage is throttled by the orifice in the inlet portion, the gas phase fuel is hard to flow into the downstream side of the liquid phase branch passage, and it is possible to more securely separate the gas phase fuel and the liquid phase fuel in comparison with the structure having no orifice.

In the fuel fractionation apparatus of the present invention, the fractionation section may extend through an area to which a heating operation is applied due to a heat wasted from the internal combustion engine as the fractionation promoting operation. It is unnecessary to supply an energy required for promoting the fuel fractionation from an external portion, by utilizing the heat wasted from the internal combustion engine as mentioned above.

The fuel fractionation apparatus of the present invention may utilize an exhaust heat of the internal combustion engine as the heat wasted from the internal combustion engine. In this case, it is possible to promote the fractionation by heating the fuel passing through the fractionation section by the exhaust heat.

The fuel fractionation apparatus of the present invention may comprise a pressure regulating device for regulating a pressure within the fractionation passage as a device for generating the fractionation promoting operation. It is possible to lower a boiling point of the fuel by lowering the pressure within the fractionation passage. Accordingly, it is possible to promote the vaporization of the fuel so as to promote the fractionation by regulating the pressure.

The fuel fractionation apparatus of the present invention may comprise a pressure control device for controlling an operation of the pressure regulating device based on a temperature of the fuel flowing through the fractionation passage. When the temperature of the fuel flowing through the fractionation passage is lower than the boiling point of the fuel under the atmospheric pressure, the fuel is hard to be vaporized. In this case, it is possible to promote the vaporization of the fuel by lowering the pressure within the fractionation passage so as to lower the boiling point of the fuel. It is possible to maintain a fractionation performance of the fractionation passage in a constant desirable state, by regulating the pressure within the fractionation passage even at the temperature at which the fuel is hard to be vaporized.

The fuel fractionation apparatus may comprise a temperature detecting device for detecting a temperature of the branch point, a temperature adjusting device capable of adjusting the temperature of the branch point, and a temperature control device for controlling an operation of the temperature adjusting device based on the temperature detected by the temperature detecting device such that the temperature of the branch point is maintained at a predetermined target temperature. In this case, it is possible to maintain the temperature at the branch point to the target temperature so as to hold a separating performance between the light component and the heavy component in a constant desirable state. In this case, the target temperature is approximately set in correspondence to various conditions such as a component of the light component to be vaporized.

In the fuel fractionation apparatus of the present invention, the temperature adjusting device may change a flow rate of the fuel conducted to the fractionation section so as to adjust the temperature of the branch point. Since the temperature of the fuel reaching the branch point is determined based on a heat amount applied from the exhaust gas in the fractionation section and a flow rate of the fuel passing through the fractionation section, it is possible to adjust the temperature at the branch point by changing the flow rate of the fuel conducted to the fractionation section. Accordingly, it is possible to adjust the temperature at the branch point to a desired range based on a simple structure such as a flow rate adjusting valve.

In the fuel fractionation apparatus of the present invention, the temperature control device may operate the temperature adjusting device such that the flow rate of the fuel conducted to the fractionation section is limited to a minimum value when the temperature detected by the temperature detecting device deflects from an allowable range with respect to the target temperature. When the temperature at the branch point is low, the fuel of the light component is not vaporized, or is vaporized only at a small amount, it is supposed that the light component reaches the branch point in the liquid phase together with the heavy component even when the fuel is introduced to the fractionation section. On the other hand, when the temperature at the branch point is high, there is a risk that even the heavy component is vaporized. On the contrary, it is possible to inhibit the light component and the heavy component from being mixed, by setting an allowable range in the temperature at the branch point and inhibiting the flow rate to the minimum value when the temperature deflects from the allowable range. In this case, the minimum value may be 0, or may be an optional value which is larger than 0. In other words, the aspect inhibiting the flow rate to the minimum includes both of a case where the fuel is not introduced to the fractionation section by stopping the supply of the fuel, and a case where the fuel is supplied to the fractionation section and the flow rate is limited to an adjustable minimum value.

The fuel fractionation apparatus may comprise a distillation fuel container for accumulating the fuel conducted from the gas phase branch passage, and an accumulation volume detecting device for detecting an accumulation volume of the distillation fuel container, and the temperature control device may lower the target temperature with the accumulation volume detected by the accumulation volume detecting device increasing. When the fuel in the gas phase is accumulated much in the accumulation volume, it is possible to conduct only the light fuel having a lower boiling point to the gas phase branch passage by lowering the target temperature. On the other hand, when the accumulation volume is small, it is possible to increase a yield of the vaporized component by increasing the target temperature, thereby quickly increasing the accumulation volume.

In the fuel fractionation apparatus of the present invention, the fractionation section may be provided within the exhaust passage of the internal combustion engine, and the branch point may be provided in an outer side of the exhaust passage. In this case, since the fractionation section is provided within the exhaust passage, it is possible to effectively carry out heat exchange between the exhaust gas and the fuel. On the other hand, since the branch point is provided in the outer side of the exhaust passage, it is possible to make an influence which the temperature fluctuation of the exhaust gas applies to the temperature fluctuation at the branch point small, and it is possible to more easily control the temperature at the branch point.

In the fuel fractionation apparatus of the present invention, an exhaust gas purifying device may be provided in the exhaust passage of the internal combustion engine, and the fractionation section may be provided so as to carry out heat exchange between the fractionation section and the exhaust passage in a downstream side of the exhaust gas purifying device. In this case, since the temperature fluctuation of the exhaust gas is absorbed by heat absorption and heat generation by the exhaust gas purifying device, it is possible to more easily control the temperature in the fractionation section and the branch point in the downstream side thereof. When the temperature of the exhaust gas purifying device is controlled to a predetermined temperature range, it is possible to further easily control the temperature at the branch point, and it is possible to control the temperature at the branch point by utilizing an apparatus for controlling the temperature of the exhaust gas purifying device.

In the fuel fractionation apparatus of the present invention, the fractionation section may be provided so as to carry out heat exchange between the fractionation section and an engine main body surrounding a combustion chamber in the internal combustion engine or a cooling water of the engine main body. During an operation of the internal combustion engine, the engine main body surrounding the combustion chamber is cooled by the cooling water, and is kept at an approximately fixed temperature. Further, since a heat capacity of the cooling water is larger than the gas, the temperature thereof is not rapidly changed. Accordingly, it is possible to stably supply the heat to the fractionation section by arranging the fractionation section so as to exchange the heat with the engine main body or the cooling water thereof. Therefore, it is possible to stably fractionate the fuel.

In the fuel fractionation apparatus of the present invention, an intended use of the separated gas phase fuel (the light component) and the liquid phase fuel (the heavy component) is not limited, however, as a preferable aspect of the intended use, there can be listed up a structure that the light component is added as a reducing agent to an NOx occlusion-reduction type catalyst. In this case, a reaction of the reducing agent within the catalyst is improved and a reduction efficiency of the NOx is improved. Further, since the light reducing agent has an improved evaporating property, it is possible to inhibit a catalyst front end face from being closed due to an attachment of the reducing agent to the catalyst by using the light component.

As is discussed in the above, according to the present invention, since the operation for promoting the fractionation is applied to the fractionation passage while the fuel is conducted in the fractionation passage, the response of the fuel to the operation for promoting the fractionation becomes sensitive in comparison with the case where a large amount of fuel accumulated in the fixed portion is fractionated all at once, and it is possible to easily and rapidly control the fuel to the state suitable for the fractionation.

BEST MODE FOR CARRYING OUT THE INVENTION

First Embodiment

Figure 1:
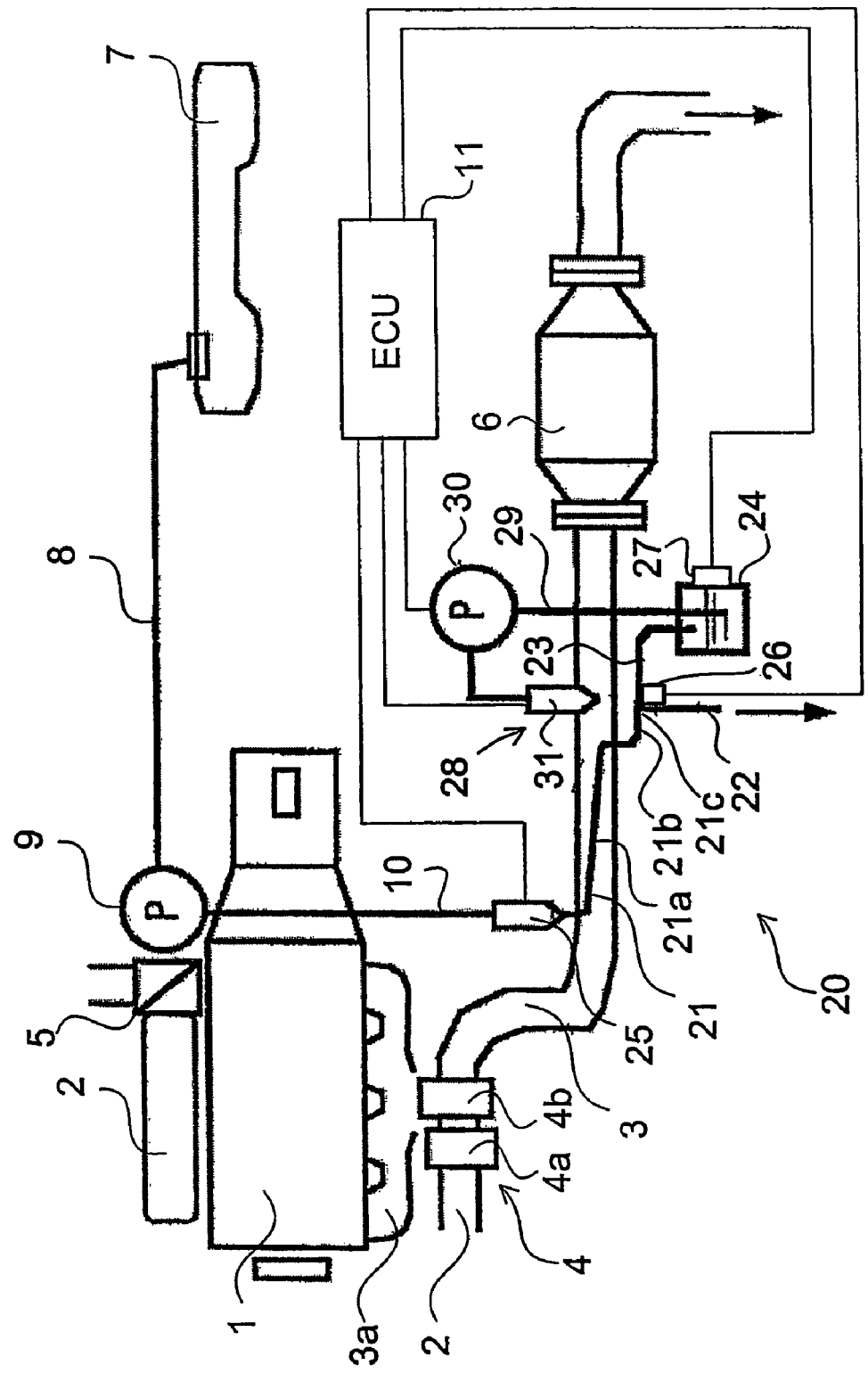
FIG. 1 is a view showing a first embodiment of a fractionation apparatus according to the present invention.

FIG. 1 shows an embodiment in which a fuel fractionation apparatus according to the present invention is applied to a diesel engine 1 as an internal combustion engine. An intake passage 2 and an exhaust passage 3 are connected to the engine 1. In the intake passage 2, there are provided a compressor 4a of a supercharger 4 which increases an intake pressure by utilizing an exhaust energy, and a throttle valve 5 for adjusting volume of intake air, and there are provided in a side of the exhaust passage 3 a turbine 4b of the supercharger 4 arranged in a downstream side of a manifold 3a, and an exhaust gas purifying apparatus 6 arranged in a downstream side from the turbine 4b, respectively. The exhaust gas purifying apparatus 6 is a known structure in which an occlusion-reduction type NOx catalyst material is carried, for example, by a filter substrate for collecting particulate. In this case, an aspect of the occlusion of NOx is not limited as far as NOx can be held.

The engine 1 is provided with a fuel tank 7 for accumulating a fuel (a gas oil), a feed passage 8 extending from the fuel tank 7, a high pressure pump 9 for feeding the fuel in the fuel tank 7 to an injector (not shown) via a feed passage 8, and a return passage 10 branched from the feed passage 8 in a downstream side of the high pressure pump 9 and provided for returning a surplus fuel in the fed fuel to the fuel tank 7.

An operation state of the engine 1 is controlled by an engine control unit (ECU) 11. The ECU 11 is structured as a computer obtained by combining a microprocessor and a peripheral device such as ROM, RAM serving as a main memory device, and the like, and controls the operation state of the engine 1 by adjusting a fuel injection amount or the like with reference to an output signals from various sensors.

The engine 1 is provided with a fractionation apparatus 20 for fractionating the fuel in the fuel tank 7. The fractionation apparatus 20 is provided with a fractionation passage 21 connected to the return passage 10, and a liquid phase passage 22 and a gas phase passage 23 which are branched from the fractionation passage 21.

Figure 2:
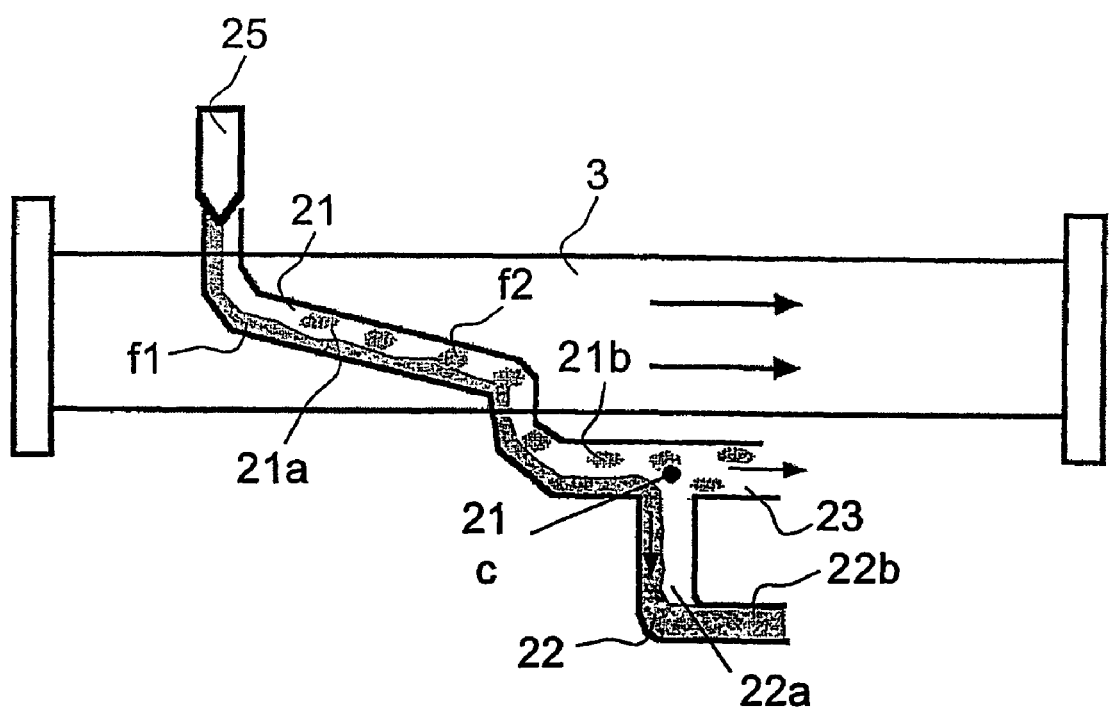
FIG. 2 is a view showing a part of the fractionation apparatus in FIG. 1 in an enlarged manner.

As also shown in FIG. 2, the fractionation passage 21 reaches a branch point 21c via a fractionation section 21a and a horizontal portion 21b. The fractionation section 21b passes obliquely within the exhaust passage 3 in an upstream side of the exhaust gas purifying apparatus 6 while being inclined with respect to a horizontal direction. The horizontal portion 21b and the branch point 21c are provided in an outer side of the exhaust passage 3. The fractionation passage 21 extends toward a lower side as a whole, and a fuel (a liquid phase fuel) f1 supplied from the return passage 10 flows toward the branch point 21c due to gravity.

The liquid phase passage 22 has a gas phase stagnation portion (a gas phase fuel inflow inhibiting portion) 22a vertically extending from the branch point 21c to a lower side, and a passage portion 22b extending in a horizontal direction from the gas phase stagnation portion 22a. An inner diameter of the passage portion 22b is set to be slightly smaller than the inner diameter of the gas phase stagnation portion 22a. A downstream side of the passage portion 22b is connected to a position which can return the fuel to the fuel tank 7. For example, the passage portion 22b may be directly connected to the fuel tank 7, or may be connected to the return passage 10 in a downstream side from a position to which the fractionation passage 21 is connected.

The gas phase passage 23 extends in a horizontal direction from the branch point 21c, a downstream side of the gas phase passage 23 is connected to a distillation fuel container 24 for accumulating a light component fuel as shown in FIG. 1, and a fractionated gas phase fuel f2 is conducted to the distillation fuel container 24 based on a pressure within the fractionation passage 21 and the gas phase passage 23. In this, case, each of the passages 21 to 23 may be formed by an appropriate material, and may employ, for example a metal pipe.

The fractionation apparatus 20 shown in FIG. 1 is further provided with a valve 25 corresponding to a temperature adjusting device, a temperature sensor 26 corresponding to a temperature detecting device, and an accumulation volume detecting sensor 27 corresponding to an accumulation volume detecting device. The valve 25 is provided as an electromagnetic valve which can open and close a connection portion between the return passage 10 and the fractionation passage 21, and a motion of the valve 25 is controlled by the ECU 11 corresponding to a temperature control device. The temperature sensor 26 is provided in the branch point 21c, and outputs a signal in correspondence to a detected temperature to the ECU 11. The accumulation volume detecting sensor 27 detects an accumulation volume of the distillation fuel container 24 and outputs a signal in correspondence to a detected accumulation volume.

The engine 1 is additionally provided with an adding apparatus 28 for adding the fuel accumulated in the distillation fuel container 24 to an upstream side of the exhaust gas purifying apparatus 6 so as to serve as a reducing agent. The adding apparatus 28 is structured such as to include, for example, an adding feed passage 29 connected to the distillation fuel container 24, an adding feed pump 30 for sucking the fuel in the distillation fuel container 24 to the adding feed passage 29, and an adding injector 31 for injecting the reducing agent to the exhaust passage 3.

Figure 3:
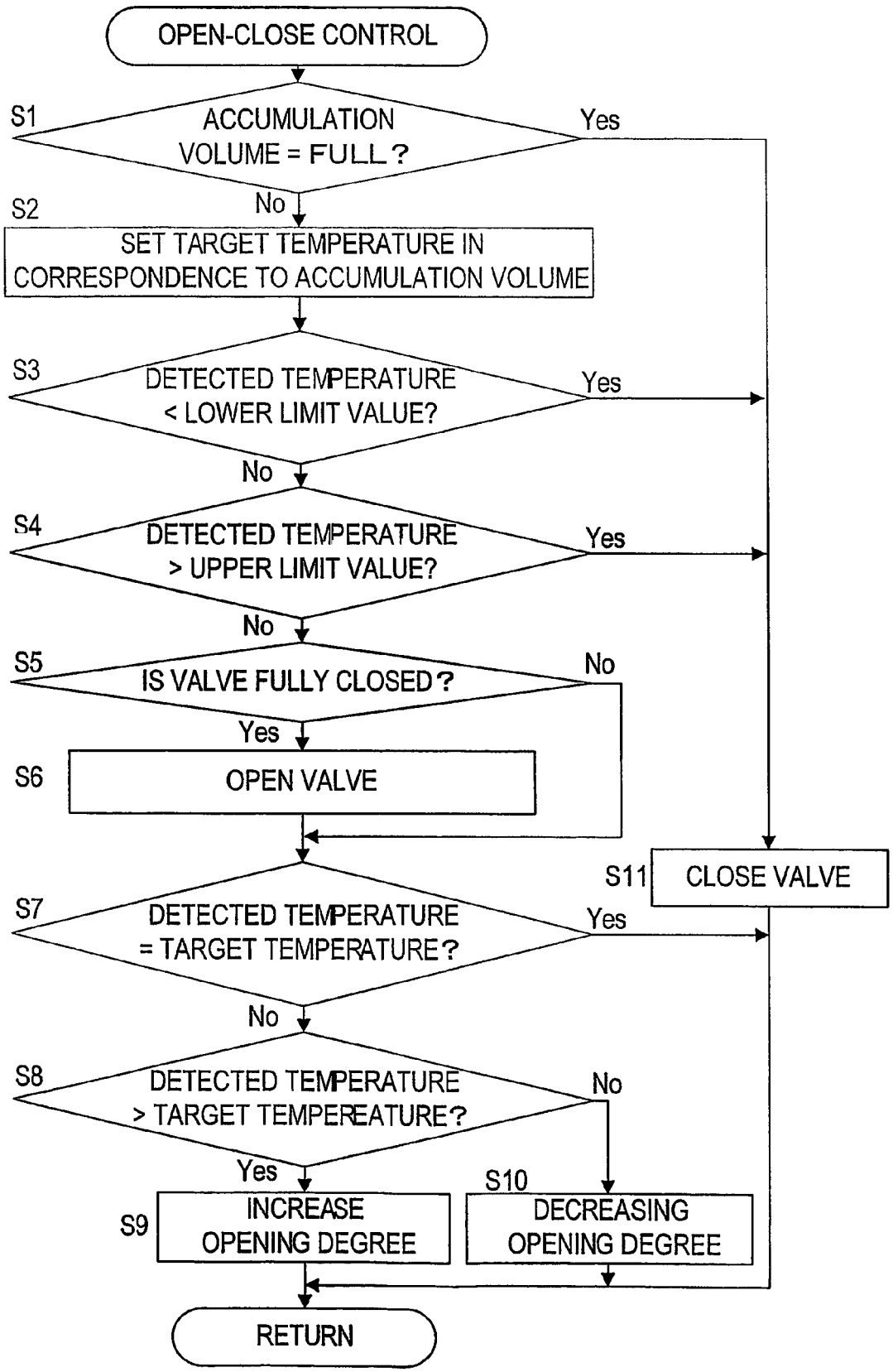
FIG. 3 is a flow chart showing a procedure of an open-close control routine which an ECU of the fractionation apparatus in FIG. 1 executes.

A description will be given of an operation of the fractionation apparatus 20 having the structure mentioned above. FIG. 3 is a flow chart showing a procedure of an open-close control routine which the ECU 11 executes for controlling a switching action of the valve 25. The routine is executed repeatedly at a predetermined cycle (for example, 0.5 second) during the operation of the engine 1.

Figure 4A:
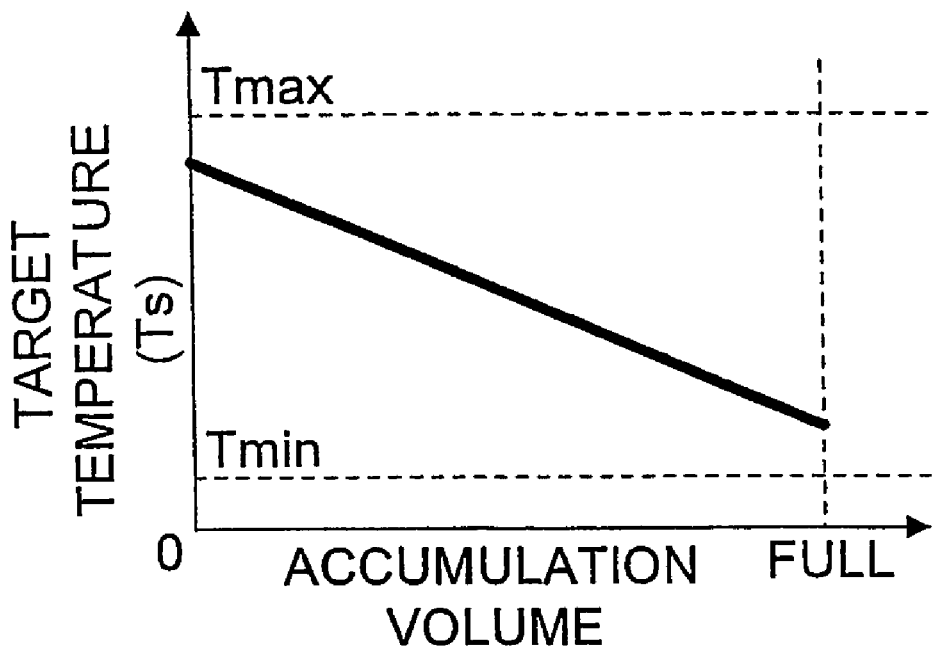
FIGS. 4A and 4B are views showing a target temperature used in the open-close control routine in FIG. 3 and a switching action of a valve in the open-close control routine in FIG. 3.

The ECU 11 first determines based on the accumulation volume detected by the accumulation volume detecting sensor 27 whether or not the distillation fuel container 24 is filled (step S1). When the ECU 11 determines that it is filled, the ECU 11 fully closes the valve 25 (step S11) and terminates the process. When the ECU 11 determined that it is not filled, the ECU 11 sets a target temperature of the branch point 21c in correspondence to an accumulation volume (step S2). At this time, as shown in FIG. 4A, the ECU 11 sets such that the more the accumulation volume is, the lower the target temperature becomes. The target temperature may be appropriately set in correspondence to a component of the fuel to be obtained according to the fractionation, however, may be set in a range, for example, around 220° C. In this case, in FIG. 4A, there is exemplified a case where the target temperature is lowered at a constant rate of change with respect to an increase of the accumulation volume, however, the rate of change may be changed with respect to the accumulation volume. In step S1, it is determined whether or not the distillation fuel container 24 is filled, however, may be determined whether or not the distillation fuel container 24 is equal to or more than an optional predetermined amount less than an accumulation volume at a fill time.

Figure 4B:
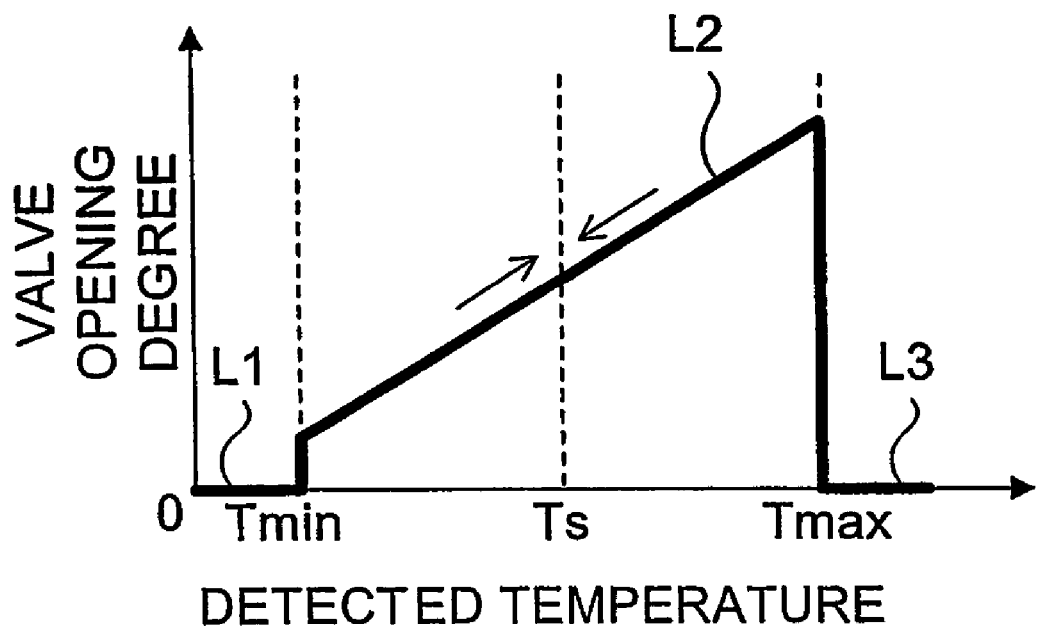

In steps S3 and S4 in FIG. 3, the ECU 11 determined whether or not the temperature detected by the temperature sensor 26 is lower than a lower limit value of an allowable range with respect to the target temperature, and whether or not it is higher than an upper limit value of the allowable range. When ECU 11 determines that it is lower than the lower limit value or higher than the higher limit value, the ECU 11 fully closes the valve 25 (step S11), and terminates the process. When the ECU 11 determines that it is within the allowable range, the ECU 11 goes to step S5. When the ECU 11 executes the processes of steps S3 and S4, whereby the detected temperature does not exist in a range between a lower limit value Tmin and an upper limit value Tmax, as shown by straight lines L1 and L3 in FIG. 4B, the valve 25 is closed. In this case, the lower limit value and the upper limit value of the allowable range may be appropriately set with respect to the target temperature, however, a temperature at which a yield of the light component to be obtained is approximately 0 may be set as the lower limit value.

In step S5 in FIG. 3, the ECU 11 determined whether or not the valve 25 is fully closed, and when the ECU 11 determines that it is fully closed, the ECU 11 controls a motion of the valve 25 so as to open the valve 25 up to a predetermined opening degree (step S6). In this case, an opening degree at this time may be set by determining an opening degree which can quickly make the temperature of the branch point 21c to the target temperature, based on conditions such as the target temperature, the temperature detected by the temperature sensor 26, the operation state of the internal combustion engine and the like. When the ECU 11 determines in step S5 that the valve 25 is not fully closed, the ECU 11 skips step S6 and goes to step S7.

After step S7, the ECU 11 controls an opening degree of the valve 25 based on the temperature detected by the temperature sensor 26 such that the temperature at the branch point 21c reaches the target temperature so as to adjust a flow rate of the fuel flowing into the fractionation passage 21. The opening degree of the valve 25 may be controlled according to various control methods, however, may be controlled in a manner as shown in steps S7 to S10.

In step S7, the ECU 11 determines whether or not the detected temperature is equal to the target temperature, and when the ECU 11 determined that they are equal, the ECU 11 terminates the process. When the ECU 11 determines that they are not equal, the ECU 11 determines whether or not the detected temperature is higher than the target temperature (step S8). When the ECU 11 determines that it is higher than the target temperature, the ECU 11 increases the opening degree of the valve 25 at only an amount in correspondence to a difference between the detected temperature and the target temperature (step S9), and terminates the process. When the ECU 11 determines that the detected temperature is not higher than the target temperature, the ECU 11 reduces the opening degree of the valve 25 at an amount in correspondence to the difference between the detected temperature and the target temperature (step S10), and terminates the process. According to the process of steps S7 to S10, as shown by a straight line L2 in FIG. 4B, the valve 25 is controlled such that the opening degree is in proportion to the detected temperature. Accordingly, the detected temperature converges into a target temperature Ts. In this case, it is possible to employ a differential control and an integral control such that the detected temperature quickly or accurately converges into the target temperature Ts, or it is possible to forecast the change of the exhaust gas temperature based on various conditions such as the operation state of the engine 1 and the like, thereby changing the flow rate of the fractionation passage 21 before the temperature of the branch point 21c is changed.

In the present embodiment, the return fuel from the injector is introduced to the fractionation passage 21 via the return passage 10. Since the temperature of the return fuel from the injector increases up to about 150° C. and the temperature thereof is higher than that of the fuel in the fuel tank 7, it is possible to quickly increase the temperature up to the fractionation temperature in the fractionation section 21a.

Further, in the present embodiment, the target temperature is set around 220° C. Since a boiling point of benzothiophene having a lowest boiling point in a sulfur content left in a low sulfur gas oil (equal to or less than 50 ppm) is 220° C., the fuel obtained via the gas phase passage 23 contains no sulfur content or hardly contains the sulfur content by fractionating at a temperature equal to or less than that temperature. Therefore, in the present embodiment, it is possible to obtain mainly the fuel in which no sulfur content is obtained. In this case, the fuel containing no sulfur content has various usability. For example, when the gas oil in which no sulfur content is contained is added as the reducing agent to the exhaust passage 3, it is possible to prevent the exhaust gas purifying apparatus 6 from being poisoned by the sulfur.

Second Embodiment

Figure 5:
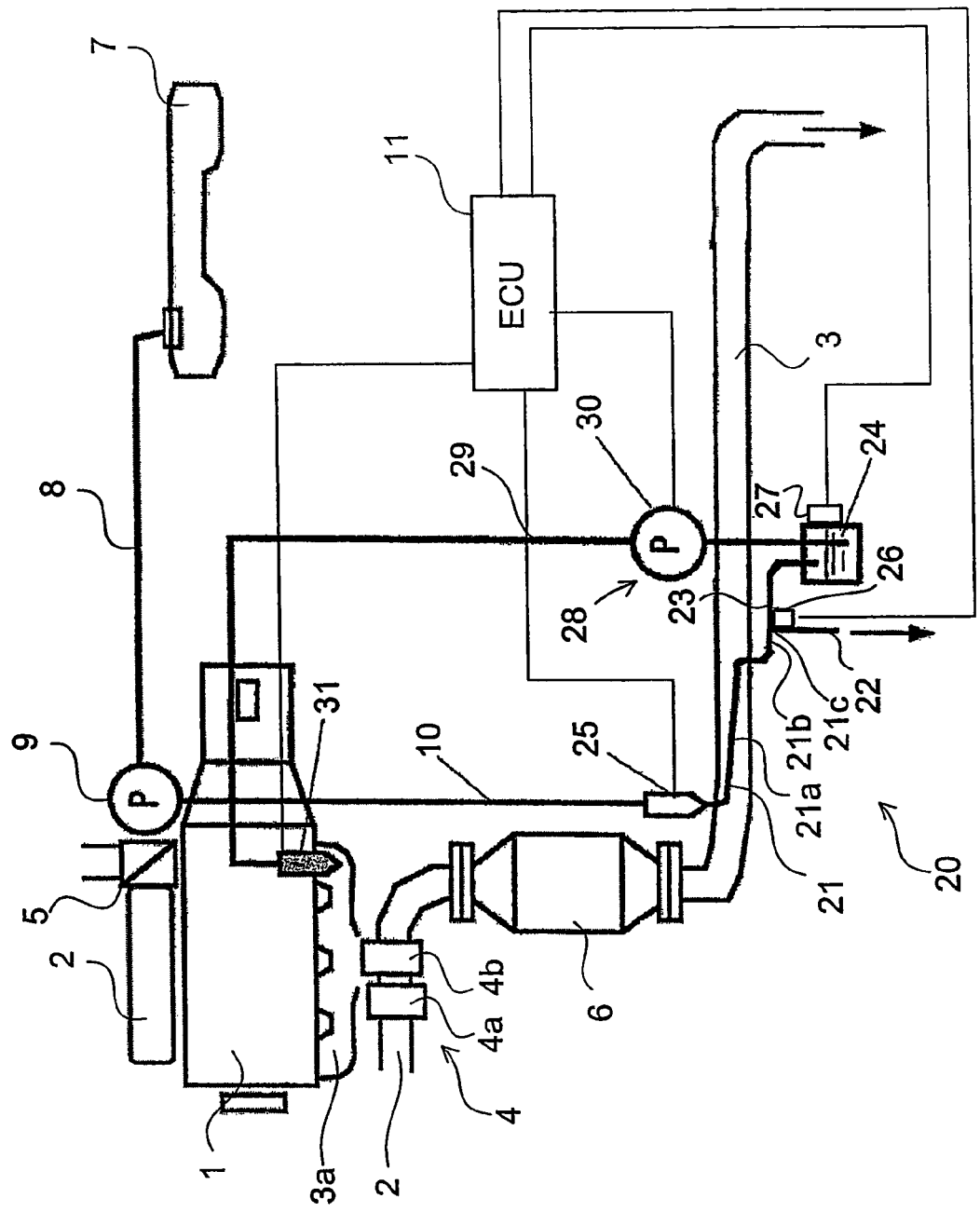
FIG. 5 is a view showing a second embodiment of the fractionation apparatus according to the present invention.

The second embodiment according to the present invention is shown in FIG. 5. In this case, in the present embodiment, the same reference numerals are attached to the common parts with the first embodiment, and a detailed description thereof will be omitted. In the present embodiment, the exhaust gas purifying apparatus 6 is provided comparatively near the turbine 4b, and the fractionation section 21a is provided so as to pass through the exhaust passage 3 in the downstream side of the exhaust gas purifying apparatus 6. Further, the adding injector 31 is provided in the manifold 3a. In the present embodiment, the NOx occlusion-reduction type catalyst is controlled and operated at 250 to 400° C. so as to effectively function. Accordingly, it is easy to control the temperature of the branch point 21c to the fractionation temperature 220° C. so as to obtain the fractionated fuel containing no sulfur.

Third Embodiment

Figure 6:
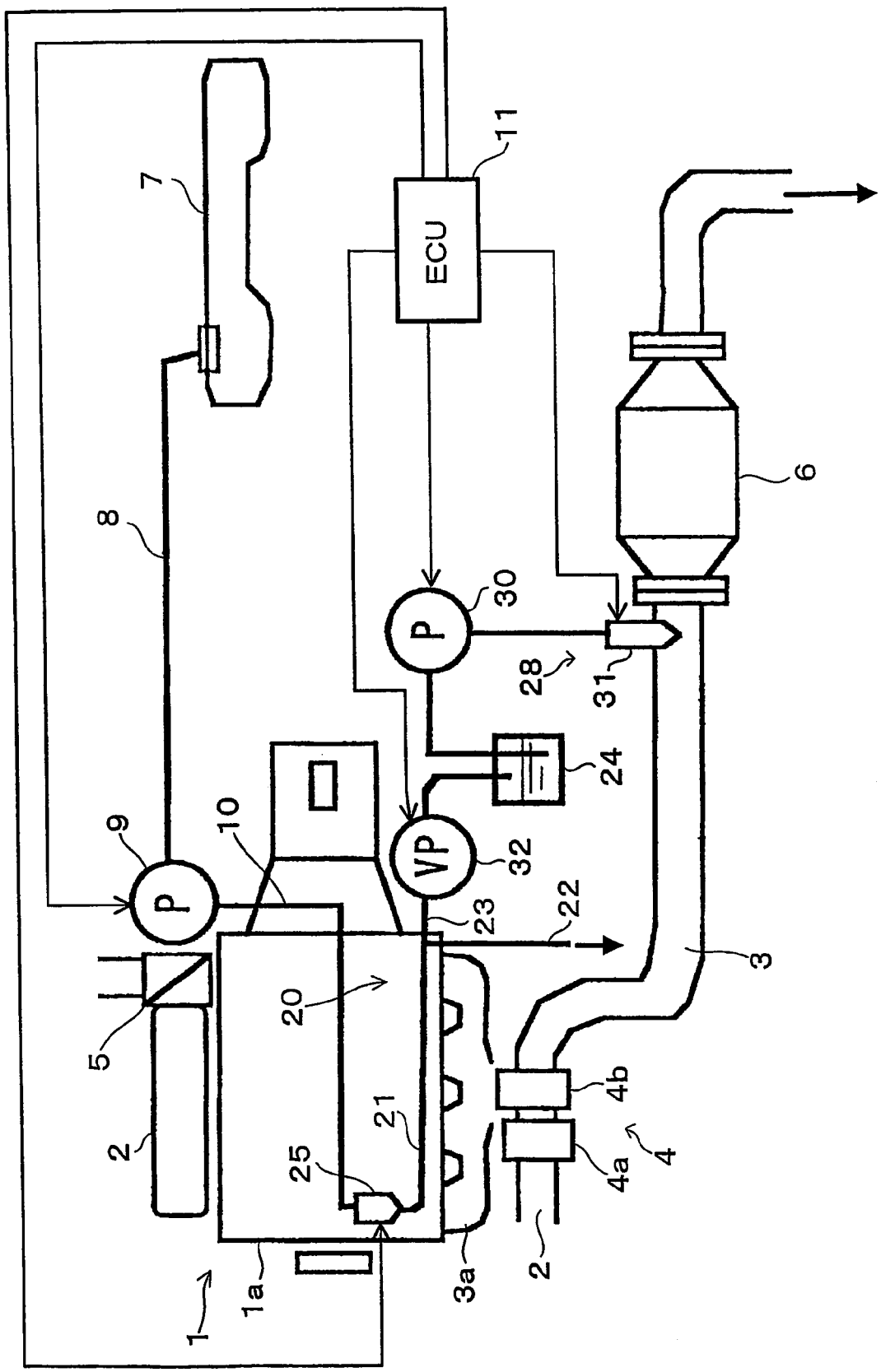
FIG. 6 is a view showing a third embodiment of the fractionation apparatus according to the present invention.
Figure 7A:
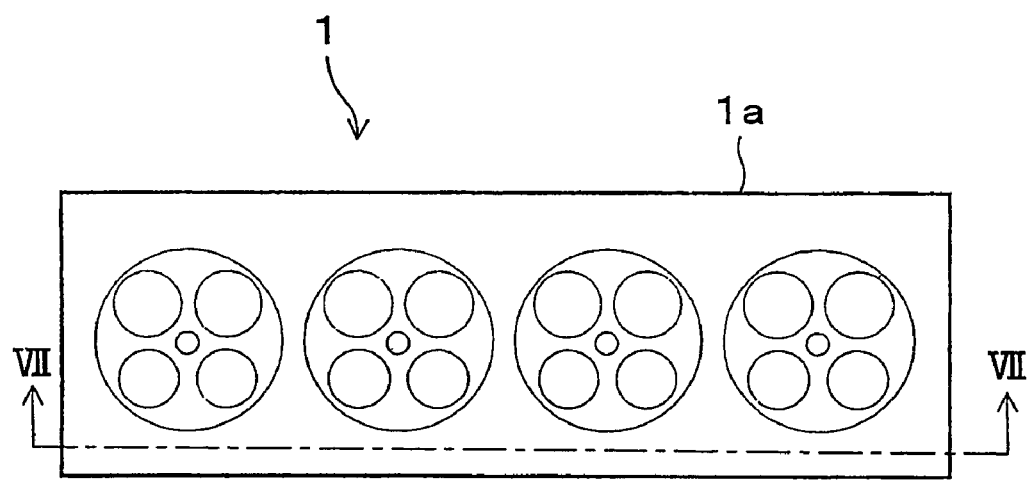
FIG. 7 is a view showing a part of the fractionation apparatus in FIG. 6 in an enlarged manner.
Figure 7B:
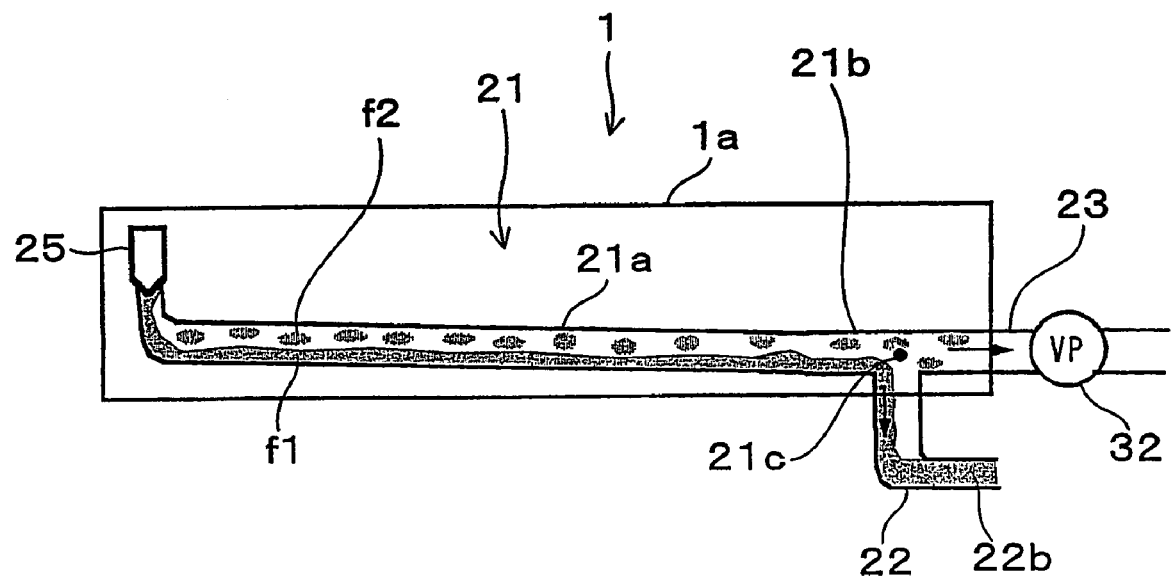

The third embodiment according to the present invention is shown in FIG. 6. Further, FIGS. 7A and 7B show views obtained by enlarging a part of the fractionation apparatus 20 in FIG. 6. In this case, FIG. 7A shows a plan view of the cylinder head 1a of the internal combustion engine 1 in FIG. 6, and FIG. 7B shows a view in the case of seeing a cross section of the cylinder head 1a along a line VII-VII in FIG. 7A from a side of the manifold 3a. In this case, in the present embodiment, the same reference numerals are attached to the common portions with those of the first embodiment, and a detailed description thereof will be omitted. As is apparent from FIGS. 6, 7A and 7B, the present embodiment is different from the other embodiments in points that the fractionation passage 21 is arranged within the cylinder head 1a corresponding to the engine main body surrounding the combustion chamber of the engine 1, and a pressure reducing pump 32 is provided as a pressure regulating device for regulating the pressure within the fractionation passage 21 in the gas phase passage 23. The cylinder head 1a is cooled even under the operation of the engine 1, and the temperature thereof is maintained at a temperature equal to or less than a predetermined temperature lower than the fractionation temperature. Accordingly, the pressure within the fractionation passage 21 is reduced by the pressure reducing pump 32, thereby lowering the boiling point of the fuel and promoting the vaporization of the fuel.

In the present embodiment, since the fractionation passage, 21 is arranged in the cylinder head 1a having a stable temperature, it is possible to stably supply the heat to the fractionation passage 21. Accordingly, it is possible to stabilize a nature of the fractionated gas phase fuel. In this case, it is possible to further promote the fractionation of the fuel by arranging the fractionation passage 21 in the side of the exhaust port which has a higher temperature in the cylinder head 1a. Further, since the fractionation passage 21 can be provided within the cylinder head 1a only based on an additional work, it is possible to inhibit the number of the parts of the fractionation apparatus 20 from being increased, and it is possible to reduce a cost.

Figure 8:
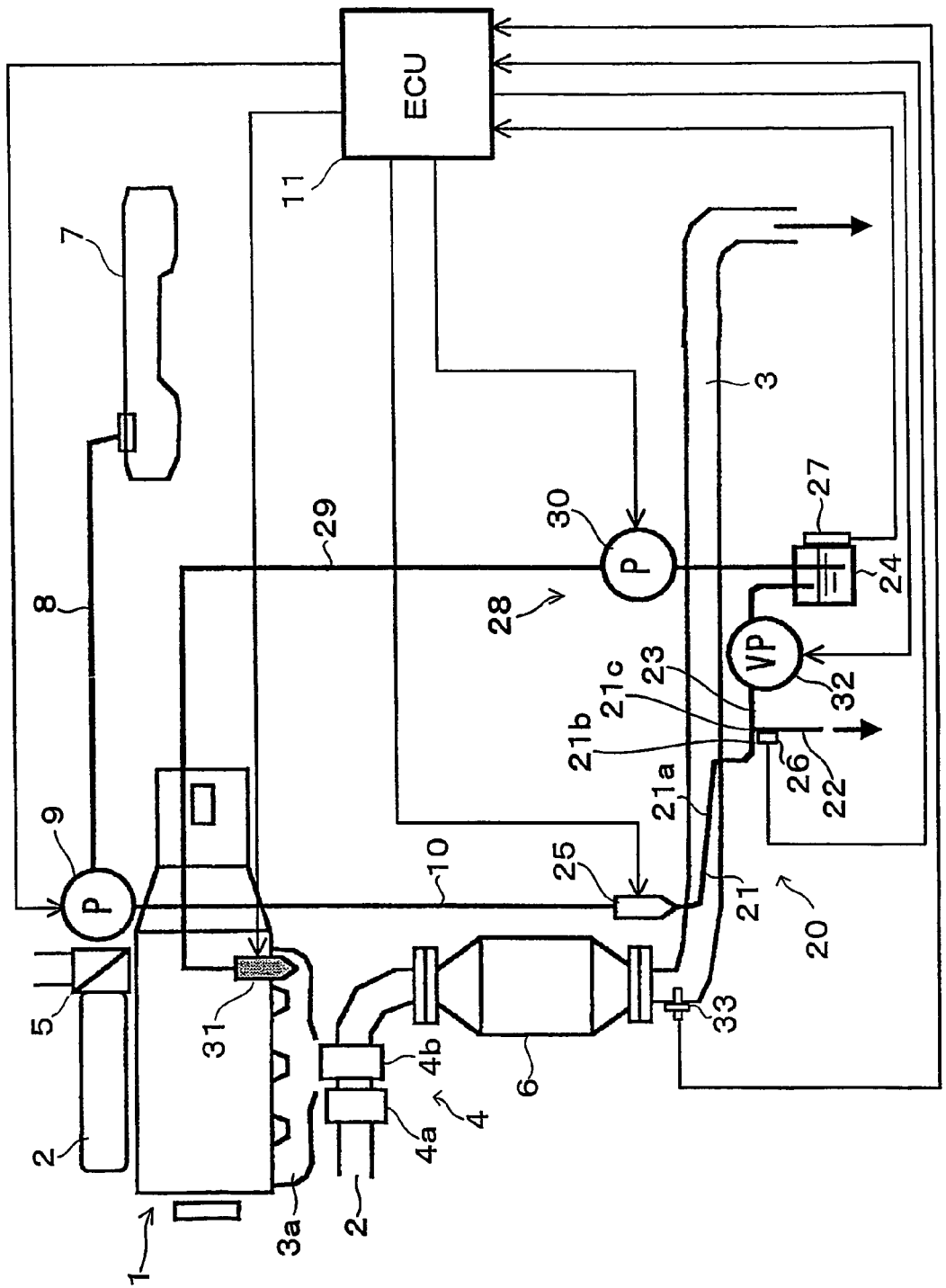
FIG. 8 is a view showing another example in the third embodiment according to the present invention.

In the present embodiment, the place in which the fractionation passage 21 is arranged is not limited to the engine main body of the engine 1. For example, the fractionation passage 21 may be provided such that the heat can be exchanged between the cooling water of the engine 1 and the fractionation passage 21. Further, as shown in FIG. 8, the fractionation passage 21 may be provided such that the fractionation section 21a extends through the exhaust passage 3.

Figure 9:
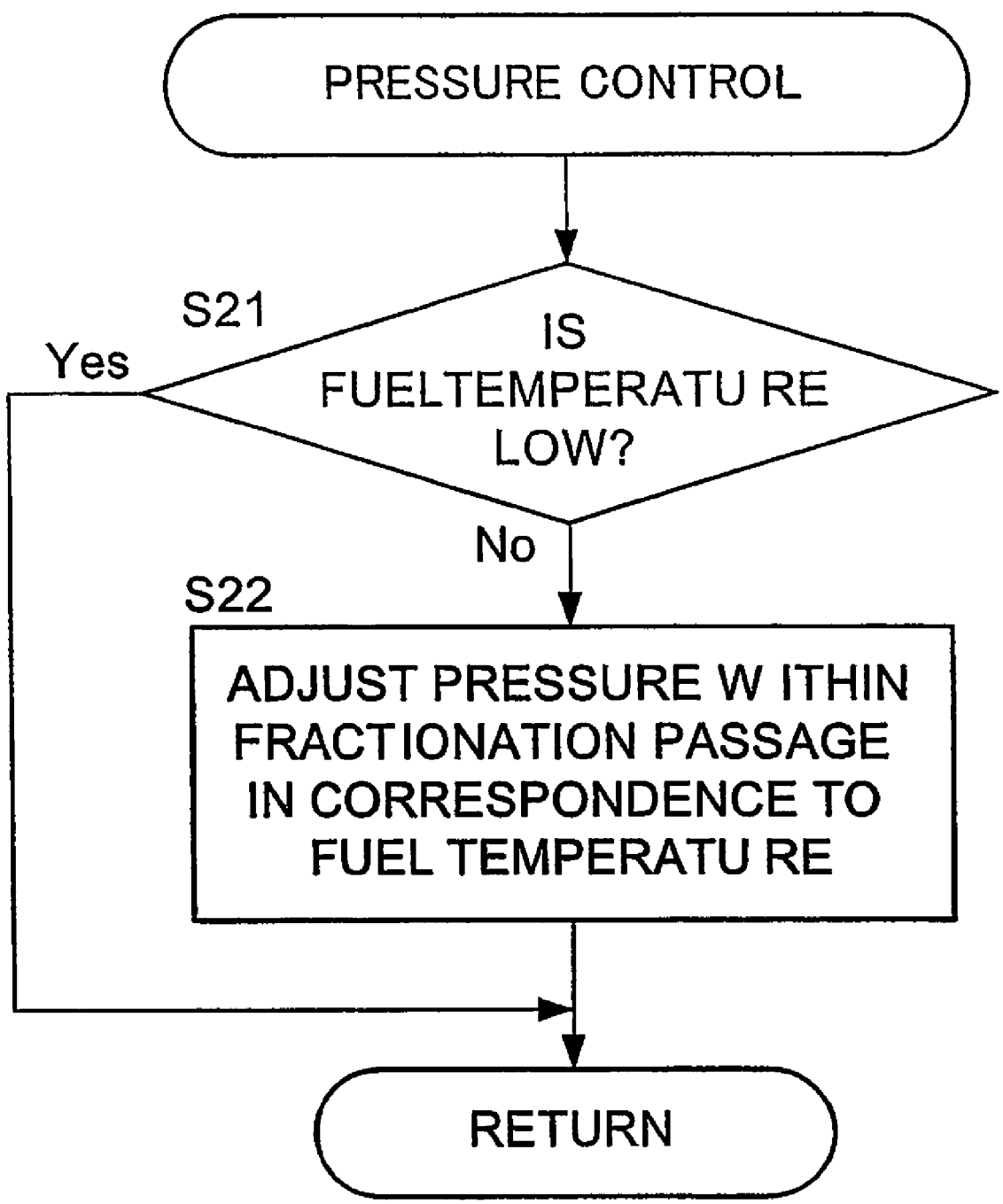
FIG. 9 is a flow chart showing a pressure control routine which an ECU in FIG. 8 executes.

When the exhaust gas temperature is low such as just after starting the engine 1, the temperature of the fuel flowing through the fractionation passage 21 does not rise up to the fractionation temperature, so that the fuel is hard to be vaporized. In the embodiment in FIG. 8, the pressure within the fractionation passage 21 is lowered by operating the pressure reducing pump 32 provided in the gas phase passage 23 in the case mentioned above, whereby the boiling point of the fuel is lowered and the vaporization of the fuel is promoted. The operation of the pressure reducing pump 32 is controlled by the ECU 11. FIG. 9 is a flow chart showing a pressure control routine which the ECU 11 executes for controlling the operation of the pressure reducing pump 32 in FIG. 8. The control routine in FIG. 9 is executed repeatedly at a predetermined cycle during the operation of the engine 1. The ECU 11 serves as the pressure control device by executing the control routine in FIG. 9.

In the control routine in FIG. 9, the ECU 11 first determines in step S21 whether or not a temperature of the fuel flowing within the fractionation passage 21 is lower than a target temperature. The temperature of the fuel can be estimated based on a temperature in connection with the fractionation of the fuel, such as the temperature detected by the temperature sensor 26 or an exhaust gas temperature sensor 33 outputting a signal in correspondence to the temperature of the exhaust gas, or the like. When the ECU 11 determines that the temperature of the fuel is not low, the ECU 11 finishes this time control routine.

On the other hand, when the ECU 11 determines that the temperature of the fuel is low, the ECU 11 goes to step S22, and operates the pressure reducing pump 32 so as to regulate the pressure within the fractionation passage 21. Since the boiling point of the fuel is lowered according to the reduction of the pressure, the ECU 11 controls the operation of the pressure reducing pump 32 such as to lower the pressure within the fractionation passage 21 according to the lower temperature of the fuel. Thereafter, the ECU 11 terminates this time control routine.

By regulating the pressure within the fractionation passage 21, it is possible to stably gasify the fuel even when the exhaust gas temperature of the engine 1 is low. Further, it is possible to set a condition by which only the light component fuel is vaporized, by regulating the pressure within the fractionation passage 21 so as to adjust the boiling point of the fuel. Accordingly, it is possible to stabilize the nature of the gas phase fuel. In this case, in the embodiment in FIG. 8, the ECU 11 may execute the open-close control routine of the valve 25 in FIG. 3 in parallel to the pressure control routine in FIG. 9, thereby regulating the pressure within the fractionation passage 21 and the temperature at the branch point 21c.

The present invention is not limited to the embodiments mentioned above, and may be carried out according to various aspects within the technical scope of the present invention. For example, the energy of the internal combustion engine utilized for promoting the fractionation of the fuel is not limited to the heat energy wasted from the internal combustion engine such as the exhaust heat or the like. It is possible to utilize any energy generated based on the operation of the internal combustion engine for promoting the fractionation.

The fractionation section 21a may be provided so as to carry out heat exchange between the section 21 and an appropriate position of the exhaust passage 3, for example, may be provided so as to extend through an inner side of the manifold 3a. In this case, since the fractionation section 21a is provided at the position having the higher exhaust gas temperature, it is possible to quickly increase the temperature of the fuel.

Figure 10:
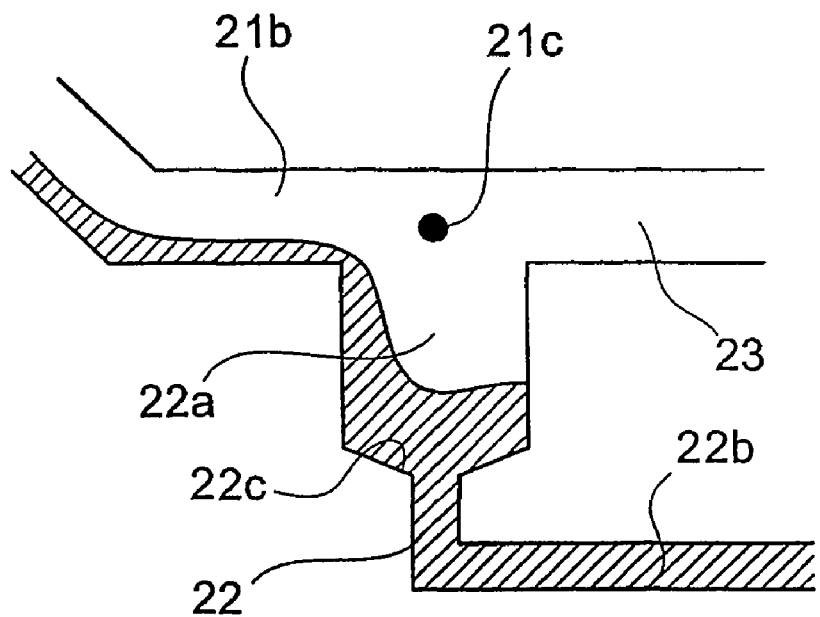
FIG. 10 is a view showing an example in which an orifice is provided in an inlet of a liquid phase fuel branch passage.
Figure 11:
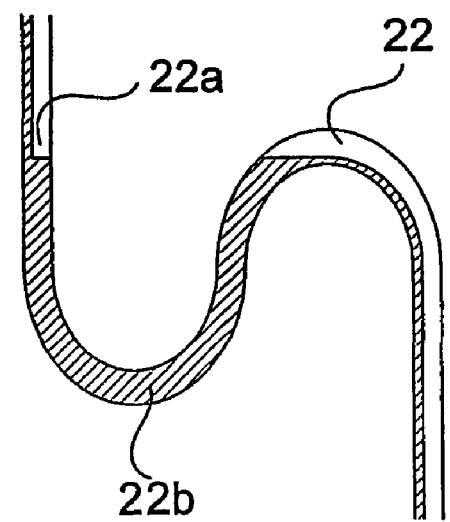
FIG. 11 is a view showing a modified embodiment of a liquid phase passage of the fractionation apparatus in FIG. 1.

The gas phase stagnation portion 22a and the passage portion 22b may be formed in an appropriate shape as far as it is possible to close the downstream side of the gas phase stagnation portion 22a by the liquid phase fuel. As shown in FIG. 10, the structure is such that an inner diameter of the liquid phase passage 22 is reduced by adding an orifice 22c in the middle of the gas phase stagnation portion 22a. In this case, the gas phase fuel is hard to flow into the downstream side from the orifice 22c, and it is possible to securely inhibit the gas phase fuel from flowing into the downstream side of the liquid phase passage 22. As shown in FIG. 11, the gas phase stagnation portion 22a and the passage portion 22b may be formed by forming the liquid phase passage 22 in a S-shaped bent shape.

The fractionation passage 21 may be connected to an appropriate position of the fuel supply system, for example, may be connected to the feed passage 8 or may be connected to the fuel tank 7.

The target temperature may be appropriately set in correspondence to the vaporized light component. For example, the target temperature is not limited to the range around 220° C., and the target temperature may be set in correspondence to the accumulation volume of the distillation fuel container 24 within the range equal to or less than 220° C., or may be fixed to 220° C. or the temperature near 220° C.

The invention claimed is:

1. A fuel fractionation method for an internal combustion engine comprising the steps of:

applying an operation for promoting a fractionation of a fuel of the internal combustion engine to a fractionation passage while making the fuel flow to the fractionation passage, thereby fractionating the fuel into a gas phase fuel and a liquid phase fuel within the fractionation passage;

conducting the fractionated gas phase fuel and the fractionated liquid phase fuel to a branch point of the fractionation passage;

separating the gas phase fuel and the liquid phase fuel to an upper branch passage and a lower branch passage, respectively due to gravity;

applying a heat operation to the fractionation passage by utilizing exhaust heat wasted from the internal combustion engine from the operation for promoting the fractionation of the fuel;

adjusting a flow rate of the fuel conducted to the fractionation passage with a temperature adjusting device so that the temperature of the branch point of the fractionation passage is maintained at a predetermined target temperature;

accumulating the fuel conducted from the upper branch passage in a distillation fuel container;

detecting an accumulation volume of the distillation fuel container with an accumulation volume detecting device; and lowering the target temperature in relation to the detected accumulation volume when the detected accumulation volume is increasing.

2. A fuel fractionation apparatus for an internal combustion engine comprising:

a fractionation passage which is connected to a fuel supply system of the internal combustion engine and reaches a branch point of a terminal end through a fractionation section to which a fractionation promoting effect of a fuel is applied;

a liquid phase branch passage which is branched to a lower side from the branch point;

a gas phase branch passage which is branched to an upper side than the liquid phase branch passage from the branch point;

a temperature detecting device for detecting a temperature of the branch point;

a temperature adjusting device adapted for adjusting the temperature of the branch point;

wherein the temperature adjusting device changes a flow rate of the fuel conducted to the fractionation section so as to adjust the temperature of the branch point; and a temperature control device for controlling an operation of the temperature adjusting device based on the temperature detected by the temperature detecting device such that the temperature of the branch point is maintained at a predetermined target temperature;

a distillation fuel container for accumulating the fuel conducted from the gas phase branch passage;

an accumulation volume detecting device for detecting an accumulation volume of the distillation fuel container, wherein the temperature control device lowers the target temperature when the accumulation volume detected by the accumulation volume detecting device is increasing;

wherein the fractionation section extends through an area to which a heating operation is applied due to a heat wasted from the internal combustion engine as the fractionation promoting operation, and an exhaust heat of the internal combustion engine is utilized as the heat wasted from the internal combustion engine.

3. The fuel fractionation apparatus according to claim 2, wherein the fractionation section is provided within the exhaust passage of the internal combustion engine, and the branch point is provided in an outer side of the exhaust passage.

4. The fuel fractionation apparatus according to claim 2, wherein an exhaust gas purifying device is provided in the exhaust passage of the internal combustion engine, and the fractionation section is provided so as to carry out heat exchange between the fractionation section and the exhaust passage in a downstream side of the exhaust gas purifying device.

5. The fuel fractionation apparatus according to claim 2, wherein an inlet of the liquid phase branch passage is provided with a gas phase fuel inflow inhibiting portion for inhibiting the gas phase fuel from flowing into a downstream side of the liquid phase branch passage due to an existence of the liquid phase fuel.

6. The fuel fractionation apparatus according to claim 5, wherein an orifice is provided in the gas phase fuel inflow inhibiting portion.

7. The fuel fractionation apparatus according to claim 2, comprising a pressure regulating device for regulating a pressure within the fractionation passage as a device for generating the fractionation promoting operation.

8. The fuel fractionation apparatus according to claim 7, comprising a pressure control device for controlling an operation of the pressure regulating device based on a temperature of the fuel flowing through the fractionation passage.

9. The fuel fractionation apparatus according to claim 7, wherein the temperature control device operates the temperature adjusting device such that the flow rate of the fuel conducted to the fractionation section is limited to a minimum value when the temperature detected by the temperature detecting device deflects from an allowable range with respect to the target temperature.

10. The fuel fractionation apparatus according to claim 7, wherein the fractionation section is provided so as to carry out heat exchange between the fractionation section and an engine main body surrounding a combustion chamber in the internal combustion engine or a cooling water of the engine main body.

* * * * *